United States Patent

Halamik et al.

[11] Patent Number: 5,862,045
[45] Date of Patent: Jan. 19, 1999

[54] SWITCHED MODE POWER SUPPLY CONTROLLER AND METHOD

[75] Inventors: Josef Halamik, Roznov, Czech Rep.; Jefferson Hall, Phoenix, Ariz.

[73] Assignee: Motorola, Inc., Schaumburg, Ill.

[21] Appl. No.: 61,301

[22] Filed: Apr. 16, 1998

[51] Int. Cl.[6] ............................................... H02M 3/335
[52] U.S. Cl. ................................................. 363/21; 363/97
[58] Field of Search ............................. 363/15, 16, 17, 363/20, 21, 26, 39, 40, 41, 78, 79, 80, 95, 97, 98, 131, 132

[56] References Cited

U.S. PATENT DOCUMENTS

| | | | |
|---|---|---|---|
| 4,336,583 | 6/1982 | Campbell et al. | 363/21 |
| 4,445,059 | 4/1984 | Steigerwald | 307/45 |
| 4,896,254 | 1/1990 | Bennett | 363/50 |
| 4,920,246 | 4/1990 | Aoki | 219/10.55 B |
| 5,045,988 | 9/1991 | Gritter et al. | 363/35 |
| 5,075,837 | 12/1991 | Feldtkeller | 363/19 |
| 5,285,369 | 2/1994 | Balakrishnan | 363/49 |
| 5,313,381 | 5/1994 | Balakrishnan | 363/147 |
| 5,455,503 | 10/1995 | Kohler | 323/273 |
| 5,455,757 | 10/1995 | Nguyen et al. | 363/21 |
| 5,457,621 | 10/1995 | Monday et al. | 363/56 |
| 5,502,370 | 3/1996 | Hall et al. | 323/284 |
| 5,745,358 | 4/1998 | Faulk | 363/95 |
| 5,745,359 | 4/1998 | Faulk | 363/95 |
| 5,757,629 | 6/1998 | Faulk | 363/21 |
| 5,764,495 | 6/1998 | Faulk | 363/21 |

OTHER PUBLICATIONS

"MC33368, Advance Information Power Factor Controller", Motorola Semiconductor Technical data, Sep. 26, 1995, MC33368 Rev 2, pp. 1–12.

*Primary Examiner*—Adolf Berhane
*Attorney, Agent, or Firm*—Robert M. Handy

[57] ABSTRACT

A switched mode power supply has a transformer and a power switch to switch a primary current for operation in a critical conduction mode. The switched mode power supply has a controller which switches off a primary current when a peak current is reached. The primary current is switched on again when a zero current condition in the secondary is detected the first time after the primary current has been switched off and a minimum primary current off time has been reached.

6 Claims, 5 Drawing Sheets

FIG. 1 —PRIOR ART—

SWITCHED MODE POWER SUPPLY CONTROLLER AND METHOD

BACKGROUND OF THE INVENTION

1. Field of the Invention

The present invention relates to electronic switching power supplies and specifically to switched mode power supplies operating in a critical conduction mode.

2. Description of the Prior Art

Switched mode power supplies operating in a critical conduction mode are known in the art. In the critical conduction mode first a current through the primary winding of the transformer of the power supply is switched on. Depending on the load on the secondary side the primary current is switched off when a peak current is reached. In response to this the energy of the electromagnetic field of the transformer is transferred to its secondary side to supply power to the load. After all the electromagnetic energy has been transformed the current on the primary side of the transformer is switched on again to start the same sequence.

With reference to FIG. 1 in which such a prior art power supply is shown this is explained in more detail. Power supply 10 has a transformer 11 which is coupled to a high voltage source. Primary winding 12 of the transformer 11 is connected to power transistor 13. If the power transistor 13 is switched on a primary current 14 starts to build up. The primary current 14 is sensed by current sensor 15. The current sensor 15 has its output 16 connected to controller 17. The controller 17 has its control output 19 coupled to gate 18 of the power transistor 13. Via the control output 19 of the controller 17 the power transistor 13 is switched on and off.

The transformer 11 has secondary winding 20 to which a load is connected. The load is not shown in the drawing—typically it can be a low power device such as a battery charger for a hand held device, in particular for a cellular telephone or radio. The load which is placed on the secondary winding 20 is sensed by load sensor 22 having an output 23. The output 23 of the load sensor 22 is coupled to input 24 of the controller 17. The signal delivered by the load sensor 22 is representative of the load placed on the secondary winding 20. Typically conductive coupling between the secondary and primary side is prevented by making usage of opto-couplers which is well known in the art.

Further the transformer 11 has an auxiliary winding 21 on its secondary side. The current flow through the auxiliary winding 21 is monitored by current sensor 25 which is connected to the auxiliary winding 21. The current sensor 25 has an output 26 which is coupled to input 27 of the controller 17.

The controller 17 has a control logic 28 which is coupled to the output 19 and the inputs 16, 24 and 27. Further the controller 17 comprises a so-called frequency clamp 29 which is a timer circuit. Output 30 of the frequency clamp 29 is connected to the control logic 28. The control logic 28 generates the control output 19. The control output 19 is also coupled internally the controller 17 to the frequency clamp 29.

In operation the controller 17 determines the peak level of the primary current 14 which depends on the load sensed by load sensor 22. The higher the load, the higher the required peak primary current 14. When the peak primary current 14 is reached the control logic 28 issues an output signal at its control output 19 to switch the power transistor 13 off. This output signal of the control logic 28 is also received by the frequency clamp 29 and starts the timer. After a certain time delay of typically in the order of 6 milliseconds the frequency clamp 29 issues an output signal at its output 30 to the control logic 28.

When the primary current 14 is switched off this results in a transfer of the electromagnetic energy stored in the transformer 11 to the secondary winding 20. The condition of the transformer 11 is sensed by the auxiliary winding 21. After the field energy of the transformer 11 has been consumed by the load, the voltage on the auxiliary winding 21 decreases in a damped oscillation. When the current through the auxiliary winding 21 drops below a certain level this results in an output signal issued by current sensor 25 at its output 26 to the control logic 28. Because of the damped oscillation there can be a sequence of such output signals.

The control logic 28 issues an output signal at its control output 19 to switch the power transistor 13 on again if both of the following conditions are fulfilled:

The time delay determined by the frequency clamp after the switching off of the power transistor 13 has expired which is signaled by the output signal issued by the frequency clamp 29; and an output signal is received from the current sensor 25 which indicates a zero current condition on the secondary side of the transformer 11.

One of the problems associated with prior art power supplies of the above described type is that the switching on of the power transistor 18 is sometimes delayed. One of the consequences is that the peak primary current 14 has to be set to a relatively high level.

The invention is therefore aimed at providing an improved switched mode power supply and an improved method for controlling a switched mode power supply.

SUMMARY OF THE INVENTION

The underlying problem of the invention is solved basically by applying the features laid down in the independent claims. Preferred embodiments are given in the dependent claims.

The invention is advantageous in that it allows to prevent unpredictable behavior of the power supply controller which in the prior art is due to the damped oscillation of the current in the auxiliary winding. The invention allows to manage such zero current detect ringing problems safely. This has also a positive impact on compliance with electromagnetic interference requirements set by legislators.

According to a preferred embodiment of the invention the frequency clamp is user programmable. In the following the term timer circuit will be used for frequency clamp. The time delay of the timer circuit is typically set to be in the order of 6 milliseconds. To vary the time delay it is at the users option to either feed a current into an external terminal of the switched mode power supply controller and/or to connect an additional resistor to the terminal or connect the terminal to ground to completely disable the timer and thus the frequency clamp. Only one external terminal is required for this feature. This is particularly advantageous if the switched mode power supply controller of the invention is integrated into an integrated circuit chip.

DETAILED DESCRIPTION OF THE EMBODIMENTS

Figure 1:
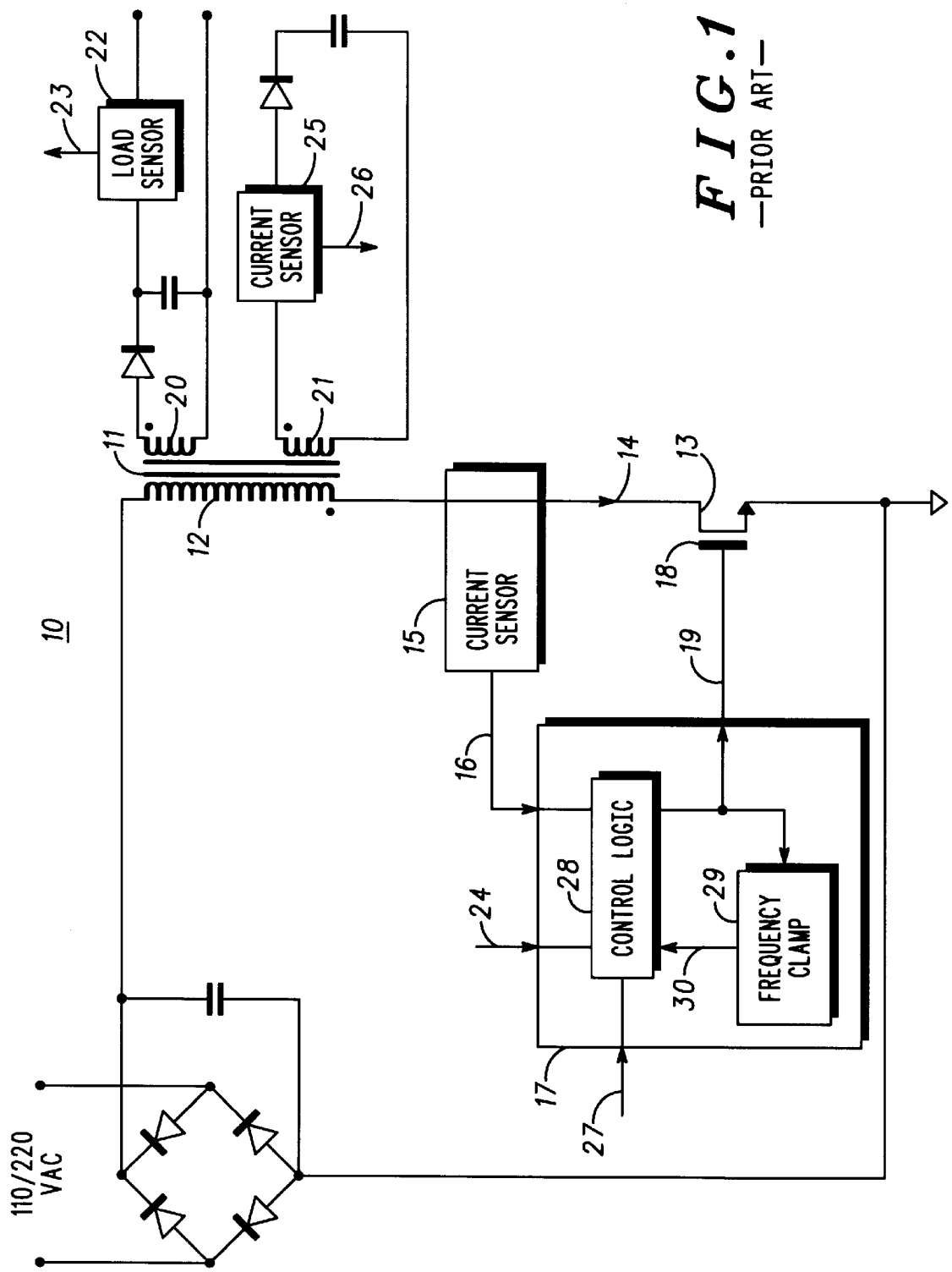
FIG. 1 shows a simplified block diagram of a prior art switched mode power supply.
Figure 2:
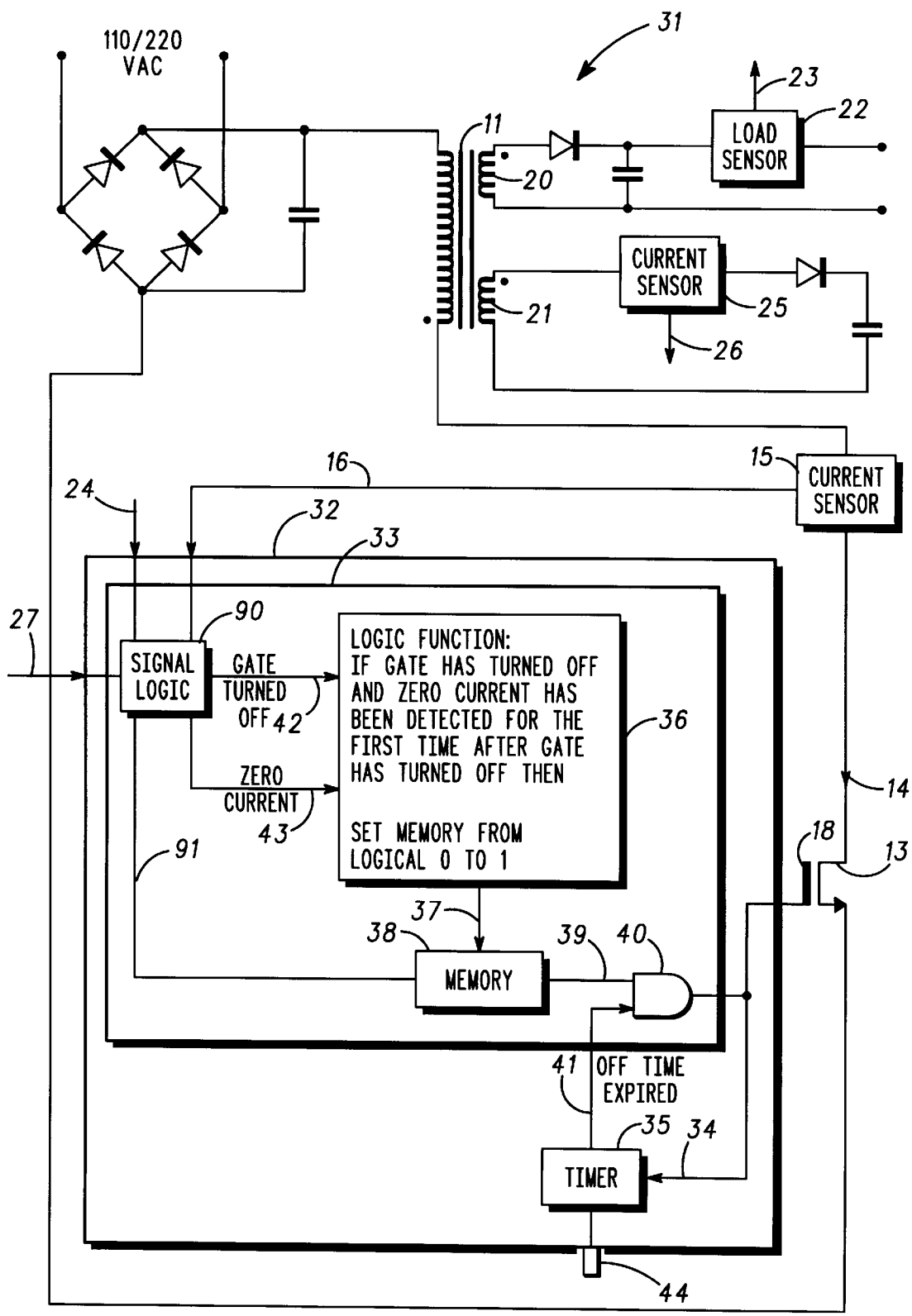
FIG. 2 shows a block diagram of a first embodiment of a switched mode power supply controller of the invention.

FIG. 2 shows a power supply 31 which incorporates the principles of the invention. The power supply 31 is an enhanced type of the power supply 10 as explained with respect to FIG. 1. Like elements of power supply 31 and power supply 10 are designated by the same reference numerals.

The power supply 31 has a controller 32 which corresponds to the controller 17 of FIG. 1. The controller 32 has a control logic 33 to generate an output signal 34 to switch the power transistor 13 on and off. Further the controller 32 comprises a timer 35 which takes the place of the frequency clamp 29 of FIG. 1.

The control logic 33 comprises logic circuitry 36 to perform a logic function. The logic circuitry 36 has its output 37 coupled to memory 38. The memory 38 can store one bit of information and is set via the output 37 of the control logic 36. The memory 38 has its output 39 connected to AND gate 40. The output 39 of the memory 38 carries the one bit information which is stored in the memory 38. The AND gate 40 has its other input terminal connected to output 41 of the timer 35. The output signal 34 is present at the output terminal of the AND gate 40. The output signal 34 is also coupled internally within controller 32 to the timer 35 to start the timer when the power transistor is switched off. The output 41 of the timer 35 goes from 0 to 1 after the predetermined time delay expired. This is indicated by the signal "OFF TIME EXPIRED" in FIG. 2.

Further the control logic 33 receives signals 42 and 43 from signal logic 90. Signal 43 goes from 0 to 1 if a zero current condition has been detected. The detection of the zero current condition is done by the signal logic 90 based on the signal received from the current sensor 25 at the input 24 of the signal logic 90 (cf. the respective description of FIG. 1). A zero current condition is present in the example considered here if a transition of the current in the auxiliary winding 21 below a certain threshold happens after the power transistor 13 is switched off.

Due to the damped oscillation of the voltage on the auxiliary winding 21 a sequence of zero current detect signals can be generated by the signal logic 90 after the electromagnetic energy of the transformer 11 has been transferred to the load.

Like it is well known in the prior art the control logic 33—like explained with reference to the control logic 28 of FIG. 1—turns the gate 18 of the power switch 13 off once the primary current 14 reaches its peak level. Like the control logic 28 of FIG. 1, the control logic 33 sets the peak level depending on the load sensed by load sensor 22. The corresponding signal which is representative of the load is received at input 27 by the signal logic 90. Depending on input 27 the signal logic sets the peak current for the primary current 14. Once the peak current of the primary current 14 is reached the power transistor 13 is switched off by the signal logic 90. This is done by resetting the memory 38 via line 91. This leads to a change of the output signal 34. Also this results in a "GATE TURNED OFF" signal which is the signal 42 received by the control logic 33.

As opposed to the prior art the logic function provided by the logic circuitry 36 ensures that the power switch is switched on again without unnecessary time delays. According to this logic function the memory 38 is set from logical 0 to 1 only if the following conditions are fulfilled:

The power switch is switched off which is indicated by the signal 43 and

The zero current has been detected for the first time after the power switch has been turned off. This means that only the first time a zero current condition is indicated by the signal 42 this is taken into consideration by the logic circuitry 36 so that the memory 38 is set. If the signal 42 toggles between 0 and 1 due to the damped oscillation of the voltage on the auxiliary winding this is ignored by the logic circuitry 36 so that the memory 38 is not reset and set unnecessarily.

If the signal OFF TIME EXPIRED is present at the output 41 of the timer 35 this leads to the output of AND gate 40 going from 0 to 1 so that the resulting output signal 34 switches the power transistor 13 on again.

This is advantageous over the prior art since already the first time a zero current condition is detected this is safely stored in the memory 38 so that if the off time delay programmed by the timer 35 also expired the power switch is switched on without any further delay. This is accomplished by storing the first occurrence of a zero current condition and ignoring the fluctuations of the zero current detection due to the damped oscillation of the current in the auxiliary winding. Thereby the zero current detection ringing problems are solved in an inexpensive and efficient way.

Once the power transistor 13 is switched on again this results in an increase of the primary current 14 up to the peak level defined by the signal logic based on the load sensed by load sensor 22. When the peak level is reached the signal logic 90 resets the memory 38 via line 91 so that the power transistor 13 is switched off. Again when the logic function of logic circuitry 36 is fulfilled and the OFF TIME EXPIRED SIGNAL is present the memory is set so that power transistor 13 is switched on. This sequence of steps is carried out repeatedly.

As a further option a user can program the timer 35 via external terminal 44 off the controller 32 to vary the pre-programmed time delay of the timer 35 or to disable the timer 35.

Figure 3:
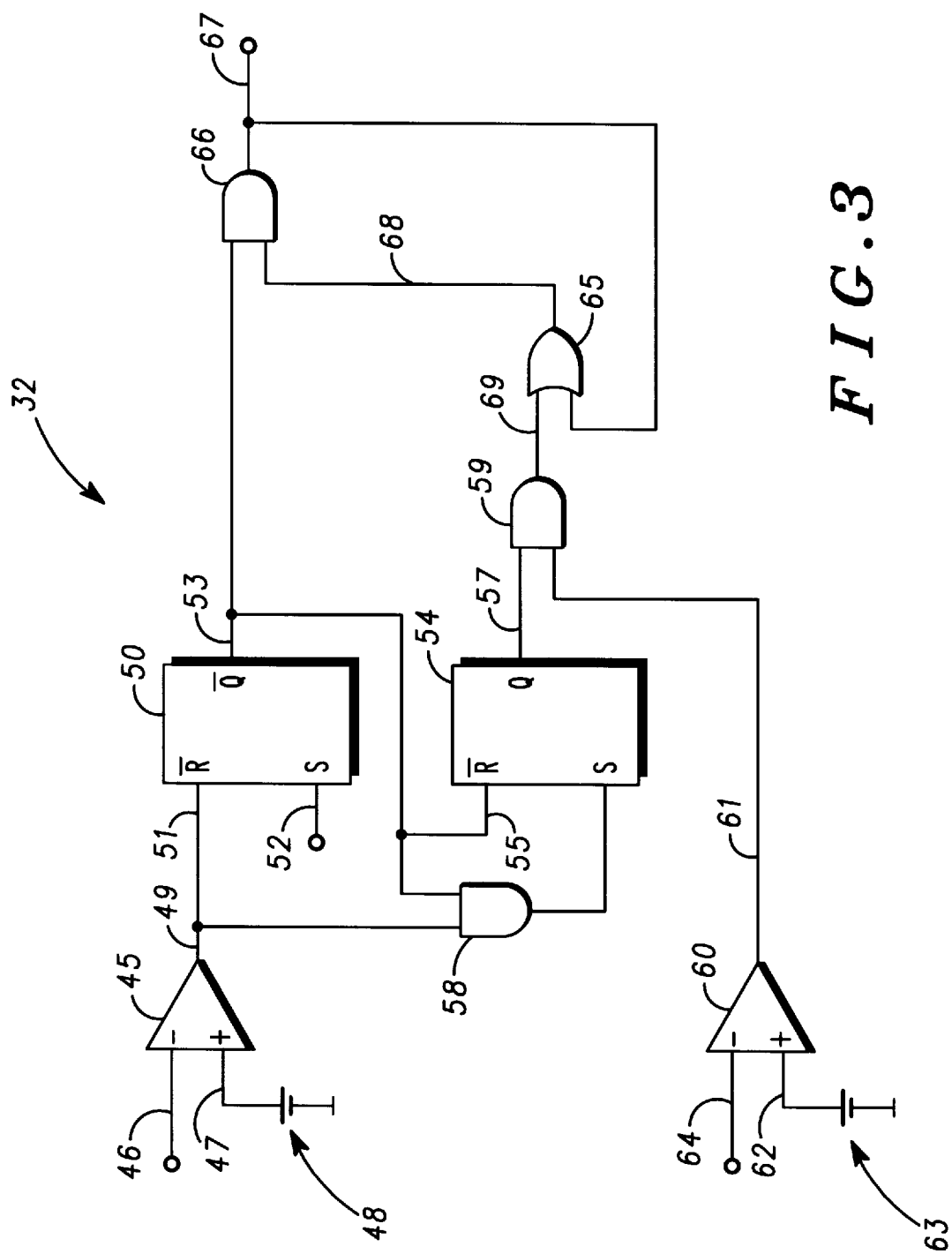
FIG. 3 shows a circuit implementation of a switched mode power supply controller of the invention.

With reference to FIG. 3 now by way of example one circuit implementation for the controller 32 is explained in the following. Again reference is made to like elements of FIG. 1 making usage of the same reference numerals.

The controller 32 has a comparator 45 which has inverting input 46 and non-inverting input 47. The input 47 is coupled to a voltage reference 48. The input 46 receives the output signal of current sensor 25 which senses the current in the auxiliary winding 21 of the transformer 11. The output 49 of the comparator 45 is coupled to the input Rbar of latch 50. The latch 50 further has a set input S and output Qbar. The latch is level sensitive and set dominant. In the following a truth table for the latch 50 is given:

TABLE I

| S | Rbar | Qbar |
|---|------|------|
| 0 | 0 | 1 |
| 0 | 1 | same |
| 1 | 0 | 0 (set dominant) |
| 1 | 1 | 0 |

The input S of the latch 50 goes high when the gate of the power transistor 13 is to be turned off. The required input signal for the input S is generated based on the signal provided by the current sensor 15 when the primary current 14 reaches its peak value. The generation of the gate off signal which is applied to the input S is as such known from the prior art as explained with reference to FIG. 1.

In the following the input terminal connected to input Rbar and the input terminal connected to the input S of the latch 50 will be designated by reference numerals 51 and 52, respectively. The output of the latch 50 Qbar is the output 53.

Further the controller 32 has a latch 54 which again is a level sensitive, set dominant latch. The latch has the inputs Rbar and S and the output Q. This corresponds to the inputs which are designated 55 and 56 respectively, and output 57. In the following a truth table for the latch 54 is given:

TABLE II

| S | Rbar | Q |
|---|------|---|
| 0 | 0 | 1 |
| 0 | 1 | same |
| 1 | 0 | 1 (set dominant) |
| 1 | 1 | 1 |

The input 55 is coupled to the output 53 and the input 56 is coupled to an output of AND gate 58 which receives the outputs 49 and 53 as input signals. The output 57 is connected to an input of AND gate 59. The other input of the AND gate 59 is connected to output 61 of comparator 60. The comparator 60 has its inverting input 62 coupled to voltage reference 63.

Further the comparator 60 has a non-inverting input 64. When the gate of the power transistor 13 is switched off this results in charging a capacitor by a current source within the timer 35. When the voltage potential at the capacitor reaches a certain level 63 this signals that the required off time of the power transistor 13 has expired. The voltage of the capacitor is coupled to the input 64 of the comparator 60. Once the capacitor voltage surpasses the level of voltage reference 63 the comparator 60 switches from 0 to 1 which indicates that the off time has expired. This is analogous to the output signal 41 of the timer 35 as explained with respect to FIG. 2.

The output of the AND gate 59 is connected to an input of OR gate 65 or as the other input of OR gate 65 is coupled to output 67 of AND gate 66. The AND gate 66 has one input terminal connected to the output 53 and the other input terminal connected to output 68 of the OR gate 65. The output 67 is the output of the controller 32 which switches the gate 18 of the power transistor 13 on and off. This is analogous to the output signal 34 as explained with reference to FIG. 2.

Figure 4:
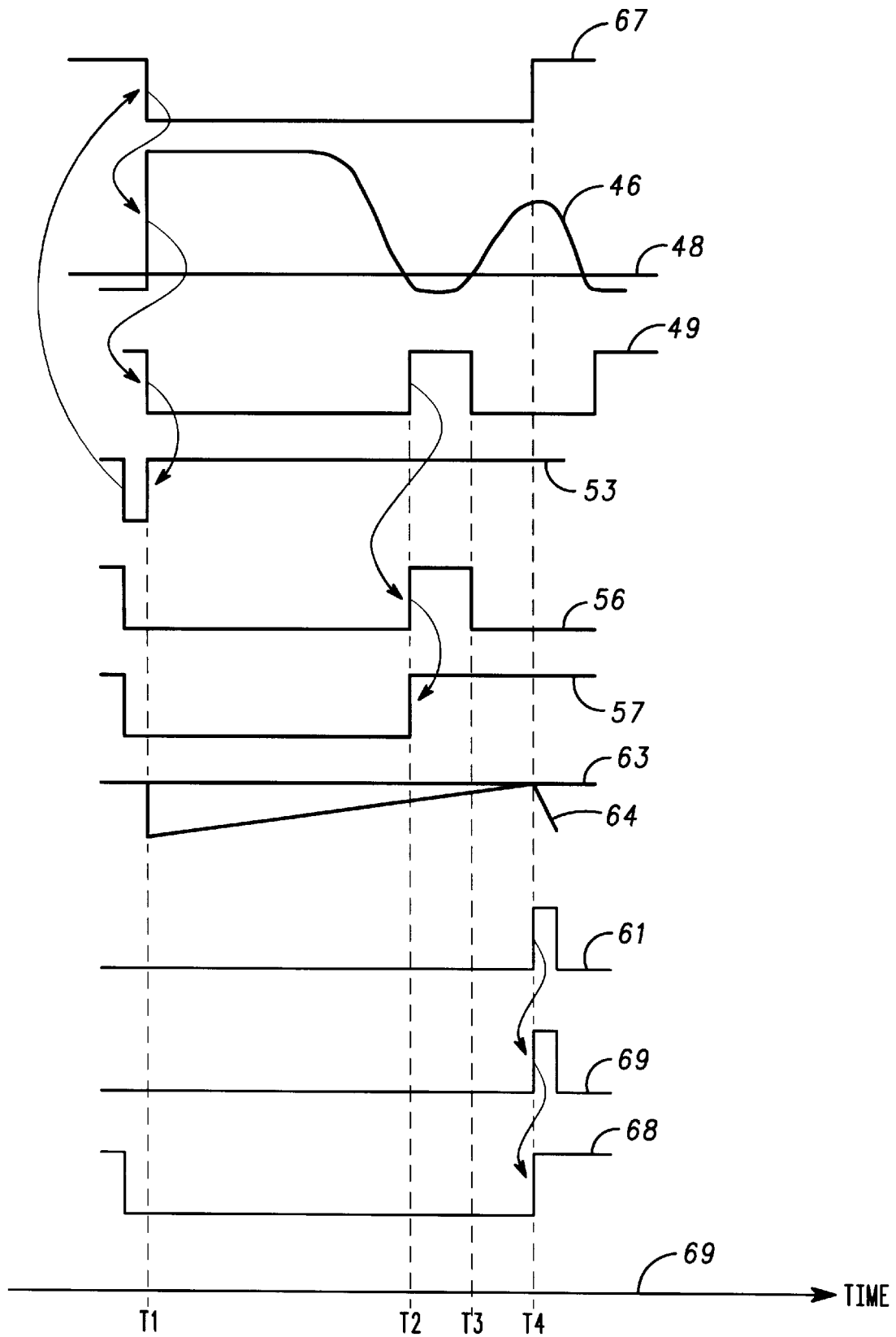
FIG. 4 shows signal diagrams for the controller of FIG. 3.

The principles of operation of the controller 32 shown in FIG. 3 are explained in more detail by making reference to the signal diagrams of FIG. 4. The reference numerals of the signals shown in FIG. 4 correspond to the circuit elements having the same reference numeral as shown in FIG. 3.

When a gate off signal is applied to the input 52 this results in a change of the state of the output 53 of the latch 50 from 0 to 1 according to the above table I. This change of the output 53 results in output signal 67 going from 1 to 0 and thereby switching the power transistor 13 off. Due to the switching off of the power transistor 13 the electromagnetic energy is transferred to the secondary side of the transformer 11 so that the input signal 46 which represents the current flow in the auxiliary winding goes up. As a consequence it surpasses the level of voltage reference 48. This results in the output 49 going from 1 to 0 which in turn causes the output 53 to go from 0 to 1 again. This sequence is indicated by the arrows in FIG. 4. At this point of time T1 on the time axis 69 the state of the output 53 indicates that the gate of the power transistor 13 has turned off.

The above described sequence also causes the input signal 56 of the latch 54 to go from 1 to 0 as well as the output 57 to go from 1 to 0 like shown in FIG. 4. When the output 67 goes from 1 to 0 to switch the power transistor 13 off at time T1 this results in the start of the charging of the capacitor of the timer 35. This is reflected by input 64 which gradually increases from the time T1 onwards.

After a certain time period has elapsed the input 46 starts to decrease due to the consumption of the electromagnetic energy in the transformer 11.

Finally this results in a damped oscillation which is also called ringing of the zero current detect signal.

The first time the input 46 crosses the threshold as defined by the voltage reference 48 at a point of time T2 this results in the following actions: the output 49 changes from 0 to 1 which indicates that the electromagnetic energy has been consumed. This causes a set impulse to the input 56 of the latch 54 so that the input 56 goes from 0 to 1 shortly after the time T2. As a consequence the output 57 also changes from 0 to 1. This is a precondition for switching the gate of the power transistor 13 on again.

Shortly after the time T2 at the time T3 the input 46 increases to a level above the reference voltage 48 in its oscillation so that the output 49 changes again from 1 to 0. This falsely indicates that there still is electromagnetic energy in the transformer 11 to be consumed which in fact is not the case. In the prior art such a situation results in unnecessary delays before the gate is switched on again. As opposed to this a change from 1 to 0 at the time T1 does not affect the output 57 of the latch 54 which remains 1 to indicate that zero current condition has been detected for the first time after the power switch 13 has been switched off—analogous to the memory 38 as explained with reference to FIG. 2.

When the input signal 64 reaches the level of voltage reference 63 this results in output 61 changing from 0 to 1 as well as output 69 of the AND gate 59. As a consequence also output 68 goes from 0 to 1 causes the output 67 of the controller 62 to go from 0 to 1 so that the gate of the power transistor 13 is switched on again.

Figure 5:
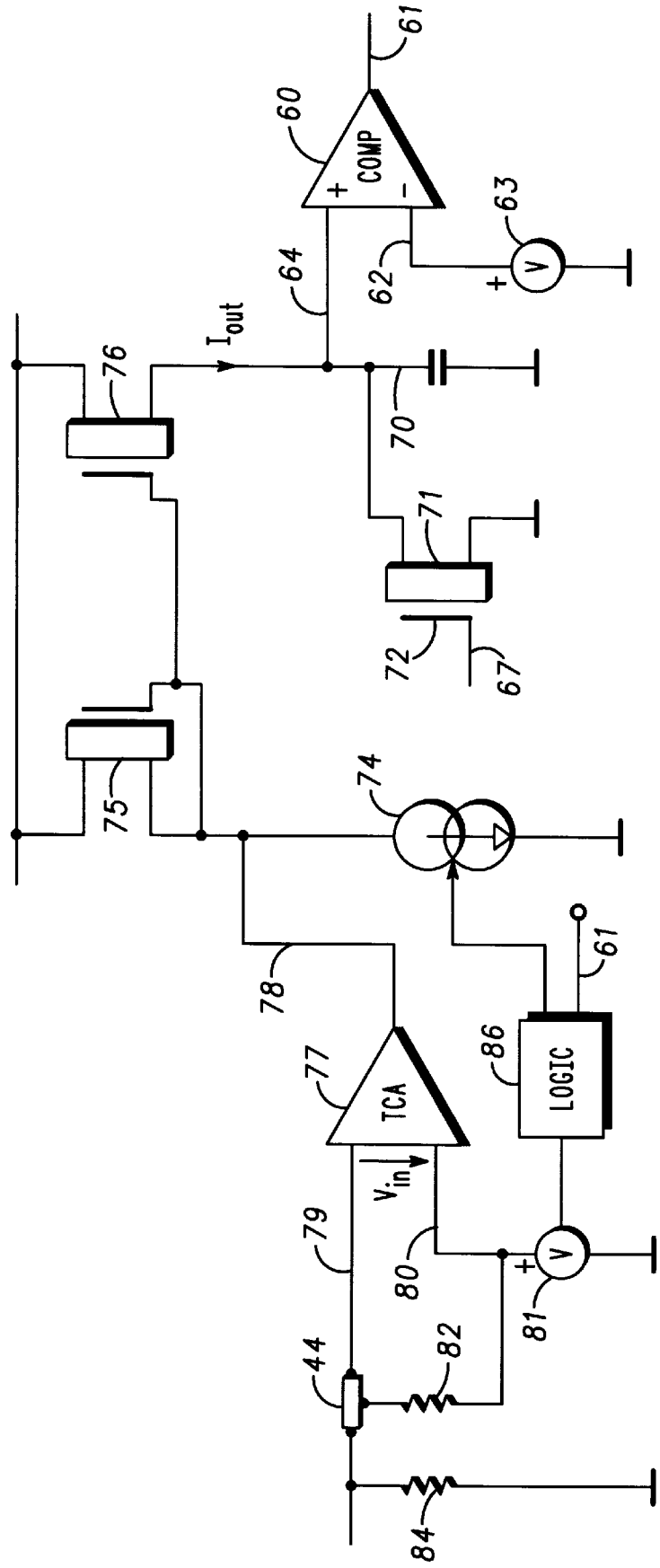
FIG. 5 shows an embodiment of the timer circuit.

With reference to FIG. 5 now one embodiment of the timer circuit 35 of FIG. 2 is explained in more detail in the following. Like elements/signals in FIG. 3/4 and 5 have the same reference numerals.

The comparator 60 has capacitor 70 coupled to its input 64 whereas the other terminal of the capacitor 70 is connected to ground. In parallel to the capacitor 70 there is transistor 71 having its gate 72 coupled to the output signal 67.

Further the capacitor 70 is connected to current mirror 73 which comprises current source 74 and transistors 75 and 76. The resulting output current of the current mirror 73 can be used to charge the capacitor 70.

Further the timer circuit 35 comprises a transconductance amplifier 77 which has its output 78 coupled to the current source 74 of the current mirror 73. The transconductance amplifier 77 has one input 79 connected to the external terminal 44. The other input 80 of the transconductance amplifier 77 is connected to a voltage reference 81 and a resistor 82. The other terminal of the voltage reference 81 is connected to ground and the other terminal of the resistor 82 is also connected to the external terminal 44.

When the power transistor 13 is switched on the transistor 71 is also switched on so that the capacitor 70 remains uncharged. When the power transistor 13 is switched off by the controller 32 this is done by the output 67 of the controller 32 like explained above with reference to FIG. 2, 3 and 4. The transistor 71 receives the same output signal 67 so that the transistor 71 is switched off when the power transistor 13 is switched off. When the transistor 71 is switched off, the output current Iout of the current mirror 73 starts charging the capacitor 70. When the voltage potential of the capacitor 70 surpasses the voltage of reference voltage 63 this results in the change from 0 to 1 of the signal 61 at the time T4 like explained with reference to FIG. 4.

The magnitude of the output current Iout of the current mirror 73 determines the time delay of the timer 35. This time delay can be changed by applying the appropriate input signals to the transconductance amplifier 77. When the external terminal 44 is connected to a current source this results in a voltage drop above the resistor 82 so that the transconductance amplifier 77 feeds an additional current into the current mirror 73 which results in Iout going up. As a consequence the time delay is shortened.

If an additional resistor 84 is connected to the external pin 44 and to ground and current is pulled out of external terminal 44 this results in a change of the input voltage of the transconductance amplifier 77 which is present between the inputs 79 and 80 in the opposite direction so that as a result Iout decreases and the time delay increases. If the external terminal 44 is connected to ground the reference voltage 81 breaks down. This is sensed by an internal logic 86 which in response to the breaking down of the voltage reference 81 disables the current source 74. As a consequence the output current Iout disappears so that the timer is disabled. In this case the internal logic 86 drives the output 61 high all the time.

We claim:

1. A switched mode power supply controller for a transformer and a power switch for switching a primary current of said transformer for operation in a critical conduction mode, said switched mode power supply controller comprising a control output for coupling to said power switch, a first circuit to detect a zero current condition on a secondary side of said transformer when said power switch is switched off;

a timer circuit having a predetermined time delay, said time delay being started when said power switch is switched off;

a second circuit comprising logic circuitry and a memory, said memory being set by said logic circuitry if the following conditions are fulfilled;
said power switch is switched off and
said zero current condition is detected the first time by said first circuit after said power switch has been switched off;

said power supply controller switching said power switch on via said control output if said memory is set and said delay of said timer circuit has expired.

2. The switched mode power supply controller of claim 1 said second circuit comprising a first latch for latching a power switch off condition and a second latch for latching a zero current condition, said second latch being enabled to be set only if said first latch has latched said power switch off condition, said first latch having a set input coupled to a gate off signal and said second latch having a set input coupled to said first circuit.

3. The switched mode power supply controller of claim 1 said timer circuit comprising a capacitor being coupled to a current mirror, said current mirror being coupled to a transconductance amplifier for varying a current delivered by said current mirror to said capacitor, said transconductance amplifier having an input voltage being controllable from an external terminal of said power supply controller, said time delay of said timer circuit being defined by said capacitor being charged up to a predefined voltage by said current delivered by said current mirror whereupon a time delay expired signal is generated by said timer circuit.

4. The switched mode power supply controller of claim 3, said transconductance amplifier having a first input connected to said external terminal and a second input connected to a voltage reference and to a resistor being coupled to said external terminal, said input voltage being applied between said first and second inputs, said input voltage being controllable at a users option by a) feeding a current into said external terminal;

b) pulling a current out of said external terminal and connecting a first terminal of an additional resistor to said external terminal and a second terminal of said additional resistor to said voltage reference, so that said current flows through said resistor, said voltage reference and said additional resistor;

c) connecting said external terminal to ground whereby said current mirror is disabled.

5. A switched mode power supply comprising a transformer having a power switch to switch a primary current of said transformer for operation in a critical conduction mode, said switched mode power supply having a power supply controller comprising a control output coupled to said power switch, a first circuit to detect a zero current condition on a secondary side of said transformer when said power switch is switched off;

a timer circuit having a predetermined time delay, said time delay being started when said power switch is switched off;

a second circuit comprising logic circuitry and a memory, said memory being set by said logic circuitry if the following conditions are fulfilled;
said power switch is switched off and
said zero current is detected the first time by said first circuit after
said power switch has been switched off;

said power supply controller switching said power switch on via said control output if said memory is set and said delay of said timer circuit has expired.

6. A method for controlling a switched mode power supply, said switched mode power supply comprising a transformer having a power switch to switch a primary current of said transformer for operation in a critical conduction mode, said method comprising the steps of a) switching said power switch off if a peak primary current is reached;

b) switching said power switch on if both of the following conditions are met
a predetermined time delay expired after said power switch is switched off in said step a); and
a zero current condition is detected the first time after said power switch has been switched off.

* * * * *